April 1, 1969     H. SCHEINBAUM     3,436,719
BATTERY CONNECTOR
Filed Feb. 15, 1967
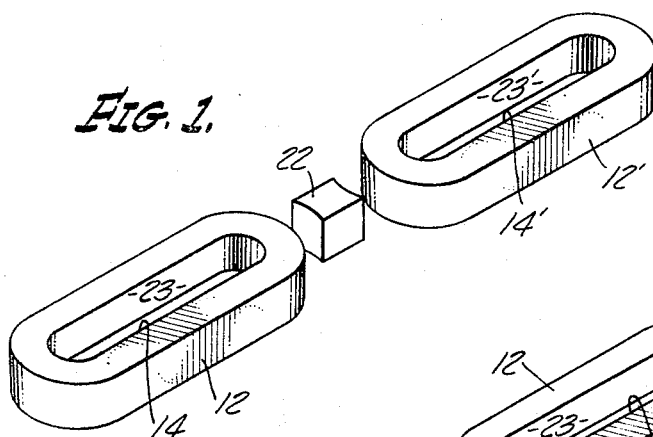
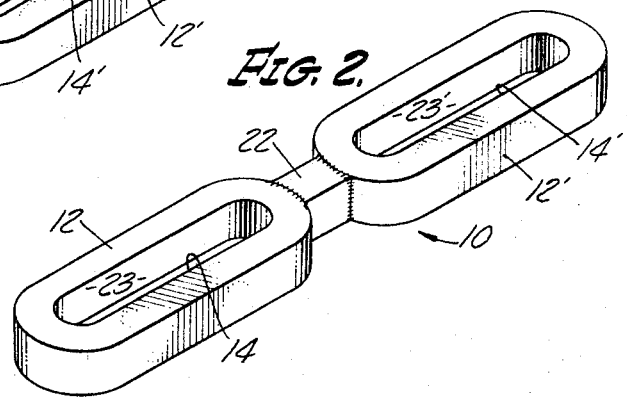
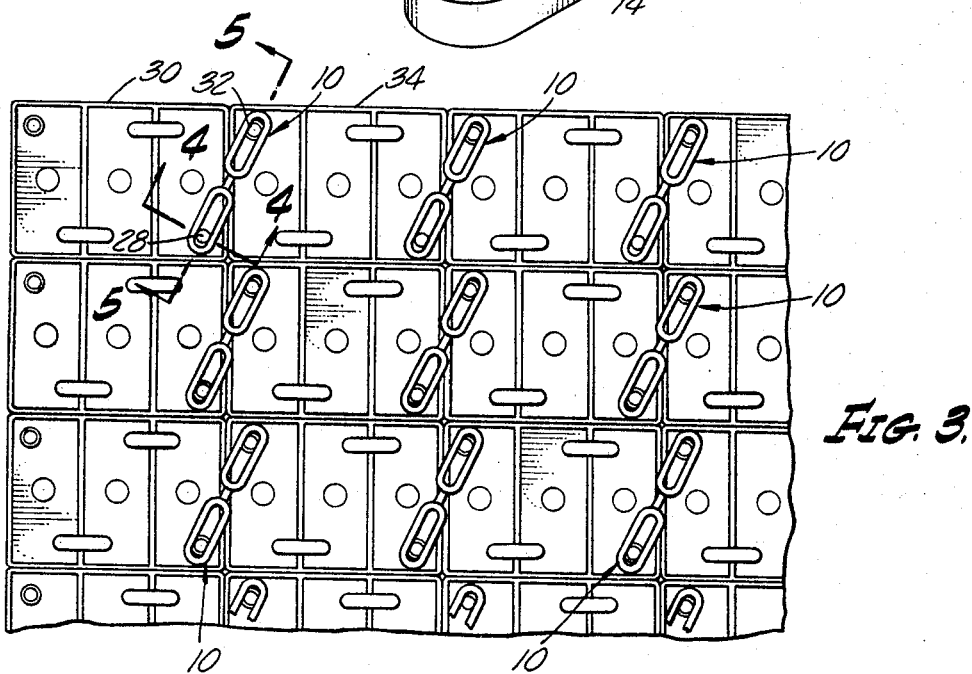
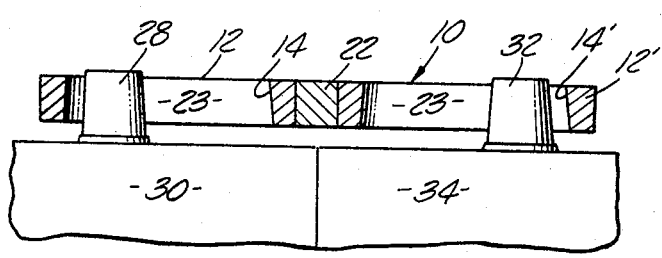
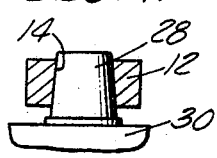
INVENTOR.
HENRY SCHEINBAUM
BY
*Herzig, Walsh & Blackham*
ATTORNEYS

United States Patent Office 3,436,719
Patented Apr. 1, 1969

3,436,719
BATTERY CONNECTOR
Henry Scheinbaum, Los Angeles, Calif., assignor to Estee Battery Company, Los Angeles, Calif., a corporation of California
Filed Feb. 15, 1967, Ser. No. 616,215
Int. Cl. H01r 25/00, 13/26
U.S. Cl. 339—224         1 Claim

ABSTRACT OF THE DISCLOSURE

The device is a terminal connector formed of two similar slotted conductive bodies or pieces adapted to receive battery terminals. The two pieces have slots to fit positive and negative battery terminals respectively. The two pieces are joined by an intermediate straight piece of selected length, simply by lead burning or the like, to form a unitary connector of desired length which can accommodate itself to connecting batteries in various patterns or relationships.

---

The invention is a battery connector for connecting positive and negative terminals of batteries. It is formed in a desired overall length from three pieces. Two pieces are of predetermined length and are longitudinally slotted, one to receive positive battery terminals and one to receive negative battery terminals. In use, the slotted pieces are forced down over the terminals. The third piece is a spacer piece of predetermined length interposed between the slotted pieces to produce a connector of predetermined length. The three pieces are joined or united with the slots in alignment by a simple process such as lead burning to produce a connector of desired length and adapted to accommdoate itself in a versatile way to many connecting applications and usages.

The present invention relates generally to storage batteries and apparatus for electrically connecting the same, and more particularly to a new and improved, connector which is adapted to electrically connect the terminals of adjacent batteries that are disposed in various relative positions.

In the manufacture of storage batteries of the lead-acid type, whether they be of the "dry charge" or the "wet" type, it has been common practice first to produce grids, which usually have been cast of a suitable type of lead alloy. The grids are of sufficient rigidity to support battery-active plate material which is pasted into openings provided therein. The grids may be used for the production of either a positive battery plate or a negative battery plate, depending principally upon the composition of the active plate material used. The active plate material conventionally employed for filling positive battery plates is a lead peroxide crystalline material. The negative battery plates are filled with a porous mass of lead in spongy form which can be easily penetrated by an electrolyte. This material is supplied to the grids in paste form and thereafter hardens, owing to inter-crystalline growth, to form a ragid, brittle structure with the grid.

Thereafter, an electrolyte, such as a water solution of sulphuric acid, is added to the battery and covers the positive and negative plates for the purpose of supplying the sulphation which combines with each of the plate materials and releases the electrical energy. Normally, new batteries are subjected to an initial charge at the factory to facilitate the release of this electrical energy. During this initial charge, it has been common practice to connect a number of batteries in series for the purpose of simultaneous charging. A commonly used device for connecting the positive and negative terminals of adjacent batteries during such initial charging comprises a pair of bell-shaped members that are connected by insulated conducting wire. The bell-shaped members are adapted to be fitted onto the upper portion of the positive and negative terminals of adjacent batteries, and to be frictionally retained thereon during charging of the batteries.

Because the bell-shaped members are connected by a flexible insulated conductor, they are adapted to be positioned on adjacent battery terminals of various relative positions. One significant disadvantage of this type of battery connecting device, however, is that the acid fumes from the batteries attack the insulation on the conductor connecting the ball-shaped members and also the connection between the bell-shaped members and the conductor, to cause deterioration of the insulation and resultant breaking of the insulated conducting wires after the connecting device has been used for a period of time.

A second type of battery connecting device has comprised bell-shaped members adapted to fit over the terminals of adjacent batteries and being connected by a rigid intermediate member formed of a conducting material or having a conductor embedded therein. While this type of connecting device has not been susceptible to damage by fumes from the acid within the batteries, it is only capable of connecting the terminals of batteries that are in a predetermined relative position corresponding to the rigidly fixed spacing of its bell-shaped members. This presents the obvious disadvantage of having to place adjacent batteries in exact relative positions so that the bell-shaped members can be frictionally placed on the positive and negative terminals thereof.

The general purpose of this invention is to provide a battery connector which embraces all of the advantages of similarly employed prior art devices and possesses none of the above-described disadvantages.

An object of the present invention, therefore, is the provision of a new and improved device for connecting the terminals of adjacent batteries.

Another object is to provide such a connecting device which is so constructed as to enable terminals of adjacent batteries disposed in various relative positions to be easily connected, irrespective of the pattern, or relationship of the batteries.

A further object is the provision of such a battery connecting device which is not susceptible to damage caused by acid fumes from the batteries.

An additional object is to provide such a battery connecting device which is of simple construction, easily and cheaply assembled or fabricated from simple, easy to handle parts, or pieces and reliable and durable in operation.

Still another object is the provision of a battery connecting device assembled in desired lengths from simple parts or pieces which is especially adapted to connect the positive and negative terminals of adjacent batteries during an initial charging of the batteries at the point of manufacture.

According to the present invention, the battery connecting device comprises elongated bodies, preferably cast in one piece from a suitable conducting material, such as a lead alloy. Each body (or part) has an elongated slot of predetermined width. One part has a slot of a width sufficient to frictionally receive the positive terminal of a battery, while an associated part has a slot of a width sufficient to frictionally receive the negative terminal of an adjacent battery. The bodies or parts are joined end-to-end by an interposed lead piece or bar of desired length preferably simply by lead burning the ends of the bodies to the said piece. Since each of the slots is elongated, the connector thus formed can be frictionally fitted over terminals of adjacent batteries that are disposed in various relative positions, thereby not requiring that the batteries be disposed in predetermined alignment or be accurately spaced before they can be connected. The connecting device of the instant invention is especially useful for connecting the positive and negative terminals of adjacent batteries in series during an initial charging of the batteries at the point of manufacture. A feature of the connector is that it can easily be assembled in any desired overall length from parts, i.e., bodies, each of which is of predetermined length.

The present invention, both as to its organization and manner of operation, together with further objects and advantages thereof, may best be understood by reference to the following description, taken in connection with the accompanying drawing in which like reference characters refer to like elements in the several views.

In the drawings:

FIGURE 1 is a perspective view of a connector parts to be asembled in accordance with the principles of the present invention;

FIGURE 2 is a view like FIGURE 1 showing the parts assembled or united by lead burning;

FIGURE 3 is a plan view showing a plurality of batteries connected in series by connectors of the present invention;

FIGURE 4 is a sectional view taken substantially along line 4—4 of FIGURE 3, showing the connector frictionally mounted on the positive terminal of a battery; and FIGURE 5 is a sectional view taken substantially along line 5—5 of FIGURE 3, showing the connector mounted on the positive and negative terminals of adjacent batteries to electrically connect them in series.

As a preferred or exemplary embodiment of the present invention, FIGURE 2 discloses a connector 10 comprising a one-piece, elongated body formed from parts 12 and 12′ having longitudinally aligned, elongated slots 14 and 14′ therein. The bodies 12 and 12′, surrounding the slots 14 and 14′, respectively, are formed with elongated, substantially straight side walls and curved end walls. The inner end walls of the bodies 12 and 12′ are integrally connected by a short straight portion 22. The parts including part or piece 22 are preferably made of lead and are secured together as shown, by lead burning, for example. Piece 22 may be made of any length so that the connector has a desired overall length. Bodies 12 and 12′, by way of example, may be 3″ or 4″ long. FIGURE 1 shows the unassembled parts of the connector.

Referring to FIGURES 3 and 4, the inner surfaces 23 and 23′ of the side walls of the bodies 12 and 12′, respectively, preferably are tapered downwardly and outwardly for the purpose of frictionally engaging the similarly tapered positive terminal 28 of a first battery 30 and negative terminal 32 of a second adjacent battery 34, respectively. It is noted that the inner side wall surfaces 23 and 23′ are disposed in parallel relation, the slots 14 and 14′ being of substantially uniform width. In this manner, the slots are adapted to receive battery terminals at any point along their length, for a purpose to be described more fully hereinafter.

Since the positive terminal of presently used storage batteries normally is of greater width than the negative terminal thereof, the slot 14 is of greater width than the other slot 14′. The body portion 12 of the connector therefore, may be mounted on the positive terminal 28 of a battery 30 by pressing it downwardly over the terminal until the inner side wall surfaces 23, defining the slot 14 are in relatively tight frictional engagament with the terminal, as shown in FIGURE 4. Similarly, the body portion 12′ may be mounted on the negative terminal 32 of an adjacent battery 34 by pressing it downwardly over the terminal until the inner side wall surfaces 23′ defining the slot 14′ are in relatively tight frictional engagement with the terminal 32, as shown in FIGURE 3.

The connector 10 of the present invention is especially useful for connecting adjacent batteries in series during an initial charging at the point of manufacture. As shown in FIGURE 3, the positive terminal 28 of each battery is connected to the negative terminal 32 of the adjacent battery through the use of a plurality of connectors 10. By providing the elongated receiving slots 14 and 14′ in the connector body portions 12 and 12′, respectively, the positive and negative terminals of adjacent batteries can be easily connected, even though the batteries may be spaced in different relative positions, owing to the fact that the terminals of the batteries are receivable in the slots at any point along their lengths. During the initial charge at the factory, the batteries, connected in series by the connectors 10, normally are connected in any suitable manner to a rectifier (not shown) that is, in turn, connected to an alternating current power source (not shown). The rectifier serves to convert alternating current to a direct charging current which is applied to the batteries for a predetermined time period that is sufficient to supply the proper initial charge to them. The connector 10 may be easily mounted on and removed from the terminals of adjacent batteries for facilitating the simultaneous charging of a plurality of batteries at the factory. The connector 10 preferably is disposed in relatively tight frictional engagement with the terminals to eliminate the possibility of sparking during the application of the initial charge to the batteries. Any pattern of terminals can readily be accommodated simply by fabricating or assembling the connector in a desired length by employing a piece 22 of the desired length.

While the connector 10 of the instant invention has been disclosed as being formed of a lead alloy and having longitudinally aligned slots of differing widths to accommodate the positive and negative terminals of adjacent batteries, it is to be understood that there are many modifications that could be made to the construction of the connector without departing from the spirit or scope of the instant invention. If the connector 10 were to be utilized to connect terminals of the same size, other than battery terminals, the width of the receiving slots could be the same, rather than being of different width in the manner described above.

From the foregoing description, it will be appreciated that the connector 10 of the instant invention is simple in construction, economical to assemble, fabricate or manufacture, is easily mountable on the terminals of adjacent batteries disposed in various relative positions for electrically connecting them, and very durable in that it is not susceptible to damage from acid or acid fumes from the batteries while it is mounted on the battery terminals. The connector readily accommodates itself to fabrication into desired overall lengths from simple parts which can easily be joined or made integral by simple processes such as lead burning.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A connector, comprising: An elongated body having means to frictionally receive spaced terminals in various relative positions for the purpose of electrically connecting them, said means comprising a pair of longitudinal positive and negative terminal slots in said body, each of said slots being of substantially uniform width, the said body being formed integrally from two separate pieces each having one of said slots therein and a third spacer piece of predetermined length between said two pieces and integrally joining them together, each of said slots being of substantially uniform width that differs from the width of the other slot, said positive terminal slot being wider than said negative terminal slot, the inner side wall surfaces of each of said slots defined within said two pieces comprising substantially straight side walls and curved end walls, and the inner end walls of said pieces being integrally connected by said third spacer piece.

References Cited

UNITED STATES PATENTS

| | | | |
|---|---|---|---|
| 482,012 | 9/1892 | Knowles | 339—224 X |
| 1,073,670 | 9/1913 | Ford | 339—224 X |
| 1,382,129 | 6/1921 | Shields | 339—224 |
| 1,420,435 | 6/1922 | Marko | 339—227 |
| 1,467,651 | 9/1923 | Prax | 339—224 |
| 1,994,251 | 3/1935 | Mueller. | |
| 2,003,053 | 5/1935 | Pavlovic et al. | 339—224 |
| 2,211,615 | 8/1940 | Brickman et al. | 339—275 X |
| 2,815,496 | 12/1957 | Boone | 339—237 |

MARVIN A. CHAMPION, *Primary Examiner.*

PERRY TEITELBAUM, *Assistant Examiner.*

U.S. Cl. X.R.

339—248